2,748,136

PROCESS FOR SEPARATING NICOTINIC ACID FROM ISONICOTINIC ACID

Martin Everett Hultquist, Bound Brook, N. J., assignor to American Cyanamid Company, New York, N. Y., a corporation of Maine No Drawing. Application May 17, 1952,
Serial No. 288,530

12 Claims. (Cl. 260—295)

This invention relates to an improved process of separating nicotinic acid from isonicotinic acid.

The separation of nicotinic acid and isonicotinic acid presents a definite manufacturing problem as recent processes have been developed for oxidizing mixtures of beta- and gamma-picoline to a mixture of nicotinic acid and isonicotinic acid. The economics of this new process are very materially affected by the cost of separating the two acids. Separation processes must be used which will not introduce permanent toxic material as both nicotinic acid and isonicotinic acid are used as intermediates for producing vitamins and pharmaceuticals and must therefore be obtained in a pure form free from any noxious impurities.

According to the present invention it has been found that an extraordinarily simple and sharp separation can be effected by treating mixtures of nicotinic and isonicotinic acids with calcium bases to form the calcium salts, in the presence of aqueous alcohols of low molecular weight. Calcium nicotinate shows such low solubility in aqueous alcohols that a very sharp separation by precipitation and filtration can be effected. The marked difference in solubility between the calcium salts of the two isomeric acids is peculiar to the calcium salt and does not apply generally to salts of the alkaline earth metals. Also, it is notable that the solubility of the calcium salts in the aqueous alcohols is just the reverse of the solubility of the free acids in water.

The particular low molecular weight alcohol does not appear to depend on the chemical structure thereof. Thus, for example, the water soluble ether alcohols, such as beta-methoxyethanol, work just as well as the water soluble paraffin alcohols, such as methyl, ethyl, isopropyl and the like.

The amount of water is also not critical. In general, it is preferable to have more alcohol than water, although the invention is not strictly limited thereto and mixtures in which there are about equal amounts of water and alcohol or slightly more water than alcohol can be employed. Of course, very dilute aqueous solutions of the alcohol in water do not behave materially differently from water itself and are therefore not suitable. There is, of course, also a minimum amount of water as only traces of water result in a solvent which is substantially alcohol. This also does not give the sharp separation. The preferred range of alcohol concentration in water is 40–90%.

The process of the present invention is applicable to various mixtures of nicotinic and isonicotinic acids, and in its broader aspects is not in any way concerned with the past history of the mixture. In a more specific aspect, however, there is included in the invention a two-step process in which the mixture of nicotinic and isonicotinic acid is first subjected to recrystallization in water. By this means, a considerable proportion of the isonicotinic acid can be obtained as a precipitate substantially free from nicotinic acid, leaving in solution a mixture in which the percentage of isonicotinic acid is materially reduced, e. g. to about 25 to 30%. This product is then subjected to the differential separation in the form of the calcium salt of the acids using the aqueous, water-soluble alcohols which constitute the principal feature of the present invention. The combined process effects some economy as the further processing of the isonicotinic acid for pharmaceutical use usually results in the elimination of the calcium which is thus wasted; and, while calcium hydroxide is cheap, even in a high degree of purity which is required for pharmaceutical use, still the combined process permits some further saving in the cost of separation. It is particularly effective where mixtures of isonicotinic acid and nicotinic acid are obtained in which the isonicotinic acid is present in considerably larger proportion than the nicotinic acid.

The invention will be described in greater detail in conjunction with the following specific examples, parts are by weight unless otherwise specified.

*Example 1*

To a mixture of 45 parts by volume of ethanol, 30 parts water, 15 parts by weight of nicotinic acid and 5 parts by weight of isonicotinic acid, heated to 70–75° C., calcium hydroxide is added until a portion on wet Brilliant Yellow test paper shows an orange spot. About 6.5 parts calcium hydroxide are required. The resulting slurry is held at 70–75° C. for 15 minutes and is then filtered hot. The cake of calcium nicotinate is washed with a hot solution of 10 parts ethanol and 5 parts water, and finally with 10 parts ethanol. The cake on drying amounts to 16.2 parts, and on slurrying in 30 parts hot water and acidifying to pH 3.5 with concentrated hydrochloric acid, cooling, filtering and washing with water, and drying, there is obtained 10.1 parts nicotinic acid.

The alcohol filtrate from the calcium nicotinate may be acidified for recovery of isonicotinic acid directly or after evaporation of most of the alcohol, but a preferred procedure is as follows:

The alcohol filtrate from the calcium nicotinate is heated to 75–80° C. and a mixture containing 15 parts nicotinic acid and 5 parts isonicotinic acid is added. There is added calcium hydroxide until a faint orange spot is shown when a portion is tested on wet Brilliant Yellow paper. After heating at 75–80° C. for 15 minutes, the hot slurry is filtered and washed as before, and there is obtained 19.3 parts calcium nicotinate. On conversion to nicotinic acid as before, there is obtained 12.5 grams.

The hot alcoholic filtrate from the calcium nicotinate on cooling separates calcium isonicotinate. This yields after filtering, dissolving in 20 parts hot water, acidifying to a pH of about 3.5, cooling to 20° C., filtering, washing with water and drying, 4.5 parts isonicotinic acid. The alcohol filtrate from the calcium isonicotinate may then be re-used again for another separation, as described above.

*Example 2*

To a mixture of 50 parts by volume of beta-methoxyethanol, 18 parts water, 15 parts nicotinic acid and 5 parts isonicotinic acid heated to 95–100° C. is added calcium hydroxide (about 6.5 parts) until a portion of the solution gives an orange spot on wet Brilliant Yellow test paper. The slurry is held at 95–100° C. for 15 minutes, and is then filtered hot. The cake of calcium nicotinate is washed with a hot mixture of 10 parts beta-methoxyethanol and 3 parts water, and then with 10 parts beta-methoxyethanol. On drying the cake, there is obtained 18.3 parts calcium nicotinate, from which there may be obtained (by the process of precipitation of Example 1) 10.8 parts of nicotinic acid.

The aqueous beta-methoxyethanol filtrate may be reused to process another portion of 15 parts nicotinic acid and 5 parts isonicotinic acid as above, whereby there is separated 19.5 parts calcium nicotinate, which can be converted to 12.7 parts nicotinic acid.

The beta-methoxyethanol filtrate from the second portion of calcium nicotinate, now being saturated with calcium isonicotinate, on cooling deposits a precipitate which on filtering, dissolving in about 25 parts water, acidifying to a pH of about 3.5, cooling, filtering, washing and drying, gives 4.1 parts isonicotinic acid.

*Example 3*

A mixture of acids containing 10 parts nicotinic acid and 10 parts isonicotinic acid is added to a mixture of 50 parts by volume of methanol and 25 parts water. After heating to 60–65° C., there is added calcium hydroxide (about 6.5 parts) until a portion shows an orange spot on wet Brilliant Yellow test paper. After heating at 60–65° C. for 15 minutes, the hot slurry is filtered and the calcium nicotinate cake is washed with methanol. The calcium nicotinate is heated to 80° C. in 100 parts water and hydrochloric acid is added to give a pH of about 3.5. After cooling to 5° C., the slurry is filtered, washed with water and dried to give 5 parts nicotinic acid.

The alcohol filtrate from the calcium nicotinate is evaporated to a heavy slurry, 100 parts of water is added and the solution is acidified to pH 3.5, with concentrated hydrochloric acid. On cooling to 20° C., filtering, washing with water and drying, there is obtained 8 parts of isonicotinic acid.

Additional recoveries may be made by evaporation of mother liquor; or the alcoholic filtrate may be re-used for further separation as described in Examples 1 and 2.

We claim:

1. In a process of separating isonicotinic acid from nicotinic acid, in the form of the respective calcium salts thereof, the steps which comprise (1) converting a mixture of said acids into their respective calcium salts by reacting the mixed acids with calcium hydroxide, in situ, in a hot aqueous alcohol solvent containing from 40 to 90% of a water-soluble alcohol by volume, the amount of said hot aqueous alcohol solvent being sufficient to dissolve substantially all of the calcium isonicotinate so formed, and (2) filtering the hot reaction mixture so obtained to separate the solid calcium nicotinate from the hot, aqueous alcohol solution of the soluble calcium isonicotinate.

2. The process of claim 1 wherein said water-soluble alcohol is ethanol and the hot, aqueous alcohol solvent contains more ethanol than water by volume.

3. The process of claim 1 wherein the said water-soluble alcohol is methanol and the hot, aqueous alcohol solvent contains more methanol than water by volume.

4. The process of claim 1 wherein the water-soluble alcohol is beta-methoxyethanol and the hot, aqueous alcohol solvent contains more beta-methoxyethanol than water by volume.

5. As an improved process of separating mixtures of nicotinic and isonicotinic acids into the individual acids in the form of the calcium salts thereof, the process which comprises (1) dissolving the mixed acids in a hot aqueous alcohol solvent containing from 40 to 90% of a water-soluble alcohol by volume, the amount of said hot aqueous alcohol solvent being sufficient to dissolve both of said acids, (2) adding calcium hydroxide to the hot, aqueous alcohol solution thereof in amounts sufficient to convert both of said acids into the respective calcium salts thereof, (3) maintaining the reaction mixture at an elevated temperature until the reaction is substantially complete and solid calcium nicotinate is precipitated therefrom, (4) filtering the hot mixture to separate the solid calcium nicotinate from the hot aqueous alcohol solution of the calcium isonicotinate and (5) subsequently recovering the calcium isonicotinate.

6. The process of claim 5 wherein the calcium isonicotinate is recovered from the hot aqueous alcohol solution thereof so obtained, by cooling the hot mother liquor to precipitate the calcium isonicotinate and filtering the so cooled mother liquor to separate the precipitated calcium isonicotinate therefrom.

7. The process of claim 5 wherein the hot mother liquor containing the calcium isonicotinate dissolved therein obtained in step 4 is recycled to step 1 thereof, prior to recovering the calcium isonicotinate therefrom.

8. In a process of separately recovering substantially pure nicotinic and isonicotinic acids from mixtures thereof, the combination of steps which comprises (1) dissolving the mixed acids in a hot aqueous alcohol solvent containing 40 to 90% of a water-soluble alcohol by the volume, the amount of said hot solvent being sufficient to dissolve both of said acids, (2) adding calcium hydroxide to the hot aqueous alcohol thereof in amounts sufficient to convert said acids into the respective calcium salts thereof, (3) maintaining the reaction mixture at an elevated temperature until the reaction is substantially complete and solid calcium nicotinate is precipitated therefrom, (4) filtering the hot liquid to separate the solid calcium nicotinate from the hot aqueous alcohol solution of the calcium isonicotinate, (5) separating the calcium isoniconitate from the filtrate so obtained, (6) recovering the isonicotinic acid from the calcium isonicotinate so obtained and (7) recovering the nicotinic acid from the calcium nicotinate so obtained.

9. The process of claim 8 wherein the filtrate obtained in step 4 thereof is recycled to step 1 thereof, prior to recovering the calcium isonicotinate therefrom.

10. The process of claim 8 wherein the calcium isonicotinate is recovered from the filtrate obtained in step 4 thereof by cooling said filtrate to precipitate the calcium isonicotinate therefrom and filtering the so cooled mixture to separate and recover the calcium isonicotinate.

11. The process of claim 8 wherein the isonicotinic acid is recovered from the calcium isonicotinate by dissolving said calcium salt in hot water, acidifying the solution with concentrated hydrochloric acid to a pH of 3.5 to decompose said calcium salt and liberate the isonicotinic acid therefrom, cooling the solution so obtained to precipitate the isonicotinic acid and filtering the mixture to separate the isonicotinic acid.

12. The process of claim 8 wherein the nicotinic acid is recovered from the calcium nicotinate by slurrying the said calcium salt in hot water, acidifying the aqueous mixture to a pH of 3.5 to decompose said salt and liberate the nicotinic acid, cooling the mixture to precipitate the nicotinic acid and filtering the so cooled mixture to separate the nicotinic acid therefrom.

References Cited in the file of this patent

UNITED STATES PATENTS

| | | |
|---|---|---|
| 1,938,253 | Hartmann et al. | Dec. 5, 1933 |
| 2,544,157 | Heinzelmann | Mar. 6, 1951 |

OTHER REFERENCES

Beilstein: vol. 22, pp. 39 and 45 (1935).
Camps: "Archiv der Pharmazie," (1902), vol. 240, pp. 352–62.